United States Patent Office 3,427,146
Patented Feb. 11, 1969

3,427,146
PHENOXYPYRIDAZINES AS HERBICIDES
Saburo Tamura, Tokyo, Tetsuo Takematsu, Utsunomiya, and Kozo Oyamada and Teruomi Jojima, Tokyo, Japan, assignors to Sankyo Company Limited, Tokyo, Japan
No Drawing. Filed Mar. 23, 1966, Ser. No. 536,613
Claims priority, application Japan, May 26, 1965, 40/31,001; Sept. 6, 1965, 40/54,520; Oct. 16, 1965, 40/63,445; Mar. 19, 1966, 41/17,042, 41/17,043
U.S. Cl. 71—76                    14 Claims
Int. Cl. A01m 9/22; C07d 51/04

ABSTRACT OF THE DISCLOSURE

Compounds for the control of undesired plants and for retarding plant growth, which have the formula

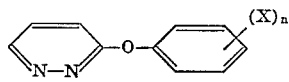

wherein X is methyl or chlorine and $n$ is an integer of 1 to 5 inclusive; provided that when $n$ is an integer of 1 to 3 inclusive, X may be the same or different and, when $n$ is an integer of 4 or 5, each X represents chlorine.

The invention relates also to some of the inorganic and trichloroacetic acid addition salts of the compounds and includes further a method for the control of undesired plants and for retarding plant growth by means of said compounds.

SUMMARY OF THE INVENTION

This invention relates to a herbicidal composition containing as an active ingredient 3-phenoxypyridazines and also to a method of utilizing such compounds for herbicidal purpose.

More particularly, this invention relates to a herbicidal composition containing as an active ingredient a compound selected from the 3-phenoxypyridazines having the formula

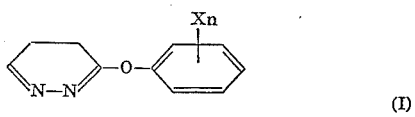

(I)

wherein X represents hydrogen, methyl or chlorine and $n$ is an integer of 1 to 5 inclusive; provided that, when $n$ is an integer of 1 to 3 inclusive, each X may be the same or different and, when $n$ is an integer of 4 or 5, each X represents chlorine atom. It also relates to a method of utilizing such compounds for herbicidal purposes.

The invention further relates to a herbicidal composition containing as an active ingredient an acid addition salt of the compound having the above Formula I wherein each X represents hydrogen and/or methyl, and a method of utilizing such salts for herbicidal purposes.

It has been found and reported that 3-phenoxy-6-chlorophenoxypyridazines show herbicidal activity (Agricultural and Biological Chemistry, 27, 728, (1963) and ibid., 29, 157 (1965)). As results of our further studies, it has now been found by us that the 3-phenoxypyridazines of the above Formula I as well as the acid addition salts thereof show superior and potent herbicidal activities to grasses, broad-leafed plants and perennial weeds, as compared with those of the known pyridazines, and also have selective herbicidal effects which can be effectively utilized in the art. In particular, the above-specified compounds are found to have potent herbicidal effects on undesirable weeds, more specifically those of Graminacea, while having the selective herbicidal effects, more specifically doing no harm to beneficial plants such as rice, wheat and cotton plants which are resistant to such compounds.

Further, it has now been found by us that, when applied to any portion of the growing plants above the ground in such an amount that the compound will not kill any beneficial plants, it will show efficient plant growth retarding effects and may be advantageously employed to prevent the growth of lateral buds in tobacco plants, to promote the defoliation in cotton plants at harvest time, and to accomplish the thinning out of superfluous fruits in various fruit trees.

Accordingly, it is an object of this invention to provide a herbicidal composition containing as an active ingredient a compound selected from the group consisting of the 3-phenoxypyridazines of the above Formula I and specific acid addition salts thereof. Another object of this invention is to provide a method of utilizing such compounds for herbicidal purpose.

A further object of this invention is to provide a plant growth retarding composition containing as an active ingredient a compound selected from the group consisting of the 3-phenoxypyridazines of the above Formula I and the specific acid addition salts thereof. A still further object of this invention is to provide a method utilizing such compounds for plant growth retarding purposes.

Among the above-mentioned active compounds of the present invention, 3-phenoxypyridazine is known and appears in the Journal of the Pharmaceutical Society of Japan, 74, 1195, (1954), while other derivatives thereof are novel compounds unknown in the prior art.

These 3-phenoxypyridazines which may be employed as an active ingredient in the present composition can be prepared by any of the following procedures: by the melting of a 3-chloropyridazine together with a substituted or unsubstituted phenol in the presence of a base, or by the catalytic reduction of the corresponding 3-phenoxy (or substituted phenoxy)-6-halogenopyridazine. More particularly, the former procedure may be carried out by melting a 3-chloropyridazine together with a substituted or unsubstituted phenol and a base, such as anhydrous potassium and sodium carbonate, in the absence of a solvent. In this procedure, the melting temperature is preferably in the range of 100–150° C., higher temperatures being undesirable because of the accompanying decomposition of 3-chloropyridazine used as starting material. The reaction is normally completed in about 5–15 minutes. The latter procedure may be carried out by any of various procedures well-known in the art, preferably by employment of Raney nickel or palladium on carbon. The latter reaction may be generally conducted at normal temperature and under normal pressure in the presence of a suitable solvent, such as an organic solvent, for example, a lower alcohol, benzene, toluene, Methyl Cellosolve (registered trademark), glacial acetic acid or ethyl acetate, a mixture of water and any of these organic solvents. Preferably we use a solvent of a lower alcohol, for example, methanol because of the solubility of a starting material therein and the easy handling. In both procedures, the final product may be recovered by a known technique. The latter procedure is more advantageous since a selective reduction of only the halogen atom in the pyridazine moiety of the starting material may be accomplished when halogen is present in the benzene ring of the starting material.

The acid addition salts useful in the present composition can be prepared by admixing 3-phenoxypyridazine or a methyl-substituted derivative thereof with a suitable acid to form the corresponding acid addition salt. Examples of those acids to be employed include an inorganic acid such as hydrochloric, sulfuric, nitric and phosphoric acids, and an organic acid such as trichloroacetic acid.

It is to be noted that the 3-phenoxypyridazine derivative containing chlorine as a substituent cannot be converted to the corresponding acid addition salt.

The preparations of some phenoxypyridazine derivatives to be employed as an active ingredient in the present composition are illustrated by the following preparations.

PREPARATION 1

A mixture of 3 g. (0.026 mole) of 3-chloropyridazine, 3.7 g. of m-chloro-p-cresol and 3.6 g. of anhydrous potassium carbonate was heated at 140° C. for about 15 minutes. After cooling, the reaction mixture was washed with a dilute aqeous solution of sodium hydroxide to give 2.2 g. of 3-(3-methyl-4-chlorophenoxy) pyridazine, in the form of scales melting at 86° C. Yield: 40%.

PREPARATION 2

To a solution of 2 g. of 3-(2-chlorophenoxy)-6-chloropyridazine in 50 ml. of methanol 1 g. of 5% palladium on carbon and 4 ml. of conc. aqueous ammonia were added and the resulting mixture was subjected to a catalytic reduction at 25° C. under atmospheric pressure for about 1½ hours, by which time the theoretical amount of hydrogen had been absorbed. Thereafter, the reaction mixture was filtered, the filtrate was concentrated and water was added to the substance thus precipitated. The mixture thus obtained was extracted several times with ether. The combined extracts were dried over anhydrous sodium, sulfate, and then the ether was distilled off. The residue thus separated was recrystallized from ligroin to give 1 g. of 3-(2-chlorophenoxy) pyridazine, melting at 108° C.

PREPARATION 3

To a solution of 2 g. of 3-(2,4,6-trichlorophenoxy)-6-chloropyridazine in 60 ml. of methanol, 0.5 g. of 5% palladium on carbon and 4 ml. of conc. aqueous ammonia were added. The resulting mixture was subjected to a catalytic reduction in the same manner as in Preparation 2 to give 1.3 g. of 3 - (2,4,6-trichlorophenoxy)pyridazine, melting at 153° C.

PREPARATION 4

To a solution of 3 g. of 3-(2-methylphenoxy)-6-chloropyridazine in 50 ml. of methanol 1 g. of 5% palladium on carbon and 4 ml. of conc. aqueous ammonia were added. The resulting mixture was subjected to a catalytic reduction in the same manner as in Preparation 2, to give 1.5 g. of 3-(2-methylphenoxy) pyridazine, melting at 78–80° C.

PREPARATION 5

To a solution of 17.2 g. (0.1 mole) of 3-phenoxypyridazine in 50 ml. of ethanol, a solution of 3.5 g. (0.1 mole) of gaseous hydrogen chloride in 50 ml. of ethanol was added. The resulting mixture was allowed to stand for 1–2 hours. Then, the ethanol was distilled off under reduced pressure, to give 2.05 g. of the white crystalline material, which was then recrystallized from ethanol-petroleum benzine (1:3) to yield 3-phenoxypyridazine hydrochloride as white needles melting at 156–157° C. The hydrochloride has a solubility in water of 30 g./100 g.

Preferred examples of the compounds which may be employed as an active ingredient in the present composition are illustratively given hereinbelow:

3-phenoxypyridazine (M.P. 71° C.);
3-(2-methylphenoxy) pyridazines (M.P. 78–80° C.);
3-(3,4-dimethylphenoxy) pyridazine (M.P. 88–91° C.);
3-(2,3,5-trimethylphenoxy) pyridazine;
3-(2-chlorophenoxy) pyridazine (M.P. 108–109° C.);
3-(3-chlorophenoxy) pyridazine (M.P. 90.5° C.);
3-(4-chlorophenoxy) pyridazine (M.P. 106° C.);
3-(2,4-dichlorophenoxy) pyridazine (M.P. 98° C.);
3-(2,6-dichlorophenoxy) pyridazine (M.P. 87–88° C.);
3-(2,4,6-trichlorophenoxy) pyridazine (M.P. 153° C.);
3-(2,4,5-trichlorophenoxy) pyridazine (M.P. 134–136° C.);
3-(2,3,4,5,6-pentachlorophenoxy) pyridazine;
3-(3-methyl-4-chlorophenoxy) pyridazine (M.P. 86° C.):
3-(4-chloro-3,5-dimethylphenoxy) pyridazine;
3-(2,4-dichloro-6-methylphenoxy) pyridazine (M.P. 128–130° C.);
3-phenoxypyridazine hydrochloride (M.P. 156–157° C.);
3-phenoxypyridazine phosphate (M.P. 132–133° C.);
3-(2-methylphenoxy) pyridazine sulfate; and
3-phenoxypyridazine trichloroacetate (M.P. 74–75° C.).

The compounds can be applied in any of a variety of compositions. In general, the compounds can be extended with a carrier material of the kind used and commonly referred to in the art such as inert solids, water and organic liquids. Thus, those that are sufficiently water soluble, such as acid addition salts of the compounds having the above Formula I wherein X is hydrogen and/or methyl, can be applied simply in aqueous solution.

The compounds mentioned above will be included in such compositions in sufficient amount so that they can exert a herbicidal effect. Usually from about 0.5 to 95% by weight of the compounds are included in such formulations.

Solid compositions can be made with inert powders. The compositions thus can be homogeneous powders that can be used as such, diluted with inert solids to form dusts, or suspended in a suitable liquid medium for spray application. The powders usually comprise the active ingredient admixed with minor amounts of conditioning agent. Natural clays, either absorptive, such as attapulgite, or relatively non-absorptive, such as china clays, diatomacous earth, synthetic fine silica, calcium silicate and other inert solid carriers of the kind conventionally employed in powder herbicidal compositions can be used. The active ingredient usually makes up from 0.5–90% of these powder compositions. The solids ordinarily should be very finely divided. For conversion of the powders to dusts, talc, pyrophyllite, and the like are customarily used.

If the active compound used is water soluble, it can be sprayed or in any other desired manner applied to an absorptive powder which can then be dried to produce a dry product. Any of the above absorptive materials can be used for the preparation of such products.

Liquid compositions including the active compounds described above can be prepared by admixing the compound with a suitable liquid diluent medium. Typical of the liquid media commonly employed are methanol, benzene, toluene and the like. The active ingredient usually makes up from about 0.5 to 50% of these liquid compositions. Some of these compositions are designated to be used as such, and others to be extended with large quantities of water.

Compositions in the form of wettable powders or liquids can also include one or more surface active agents, such as wetting, dispersing or emulsifying agents. The surface active agents cause the compositions of wettable powders or liquids to disperse or emulsify easily in water to give aqueous sprays.

The surface active agents employed can be of the anionic, cationic, or nonionic types. They include, for example, sodium long-chain carboxylates, alkyl aryl sulfonates, sodium lauryl sulfate, polyethylene oxides, lignin sulfonates and other surface active agents.

When used as a pre-emergence treatment, it is desirable to include a fertilizer, an insecticide, a fungicide or another herbicide, such as 2,4 - dichlorophenoxyacetic acid, 2-methyl-4-chlorophenoxyacetic acid and pentachlorophenoxide, and salts, amides and esters thereof.

In order that the invention can be better understood, the following examples are given. All parts are given by weight unless otherwise indicated.

EXAMPLE 1

Fifty parts of 3-phenoxypyridazine, 45 parts of bentonite and 5 parts of polyoxyethylene alkyl aryl ether were mixed and pulverized to give a wettable powder.

EXAMPLE 2

Following the procedure of Example 1 by using 50 parts of 3-(2-chlorophenoxy) pyridazine instead of 3-phenoxy-pyridazine, there was also obtained a wettable powder.

EXAMPLE 3

A mixture of 10 parts of 3-(3-methyl-4-chlorophenoxy) pyridazine, 50 parts of bentonite, 40 parts of talc and a small amount of sodium alkylbenzene sulfonate was mixed up with water to make granules, which were then dried and screened to give a granule having a particle size in the range of 20–80 mesh.

EXAMPLE 4

Forty parts of 3-phenoxypyridazine hydrochloride, 55 parts of water and 5 parts of sodium alkylbenzene sulfonate were homogeneously mixed to give a liquid.

The method of this invention comprises applying the above-specified active compounds to the locus or area to be protected from undesirable plant growth. The active compound is, of course, applied in an amount sufficient to exert the desired herbicidal action. The application can be made directly upon the locus or area and the plant during the period of infestation. Preferably, however, certain 3-phenoxypyridazine compounds are applied directly to the soil prior to weed infection, that is as a pre-emergence treatment.

The herbicidal effects of the active compounds in this invention are more fully illustrated by the following experiments and results.

EXPERIMENT 1.—PRE-EMERGENCE TREATMENT TEST

Fifty seeds of each of crabgrass, soy bean, and chick weed were sowed in the ground of 1 square meter, in admixture with the surface soil in the depth of about 2 cm. thereunder. The wettable powders containing the test compounds given below were diluted with water, sprayed upon the seeded ground at a rate of 25 g. per area and then the whole plot was placed in a green house. After 25 days, killing rates were investigated. The results are listed in the following Table I.

TABLE I

| Test compound,[1] Xn | Killing rates (percent) | | |
|---|---|---|---|
| | Crab-grass | Soy bean | Chick-weed |
| H | 100 | 100 | 84 |
| 2-CH₃ | 100 | 100 | 100 |
| 3,4-di-CH₃ | 100 | 90 | 95 |
| 2,3,5-tri-CH₃ | 100 | 100 | 82 |
| 2-Cl | 100 | 100 | 100 |
| 3-Cl | 100 | 100 | 100 |
| 4-Cl | 100 | 74 | 80 |
| 2,4-di-Cl | 100 | 100 | 100 |
| 2,6-di-Cl | 100 | 80 | 94 |
| 2,4,6-tri-Cl | 100 | 100 | 100 |
| 2,4,5-tri-Cl | 100 | 78 | 86 |
| 2,3,4,5,6-penta-Cl | 100 | 80 | 100 |
| 3-CH₃-4-Cl | 100 | 100 | 100 |
| 2,4-di-Cl-6-CH₃ | 100 | 80 | 64 |
| H (hydrochloride) | 100 | 100 | 100 |
| H (phosphate) | 100 | 100 | 100 |
| 2-CH₃(sulfate) | 100 | 100 | 100 |
| 2-CH₃(trichloroacetate) | 100 | 82 | 74 |
| Control (3-phenoxy-6-chloropyridazine) | 20 | 14 | 0 |
| Control [3-(2,6-dichlorophenoxy)-6-chloropyridazine] | 30 | 16 | 5 |

[1] As to test compounds, only "Xn" substituents in the above formula (I) will be shown in this table for convenicence's sake.

It will be noted from the above results that the active compounds in the present invention show much higher activities in the inhibition of germination and killing of grasses and broad-leafed plants, as compared with those of the known 3-phenoxy-6-chloropyridazines.

EXPERIMENT 2.—SUSCEPTIBILITY TEST TO VARIOUS PLANT SEEDS

Under the same procedures and conditions as in the above Experiment 1, susceptibilities of 3-phenoxypyridazine to various plant seeds given below were investigated. The results are given in the following Table II.

TABLE II.—KILLING RATES (PERCENT)

| Rates of test compound (g./a.) | 25 | 50 | 100 |
|---|---|---|---|
| Barnyard grass | 100 | 100 | 100 |
| Corn | 45 | 60 | 100 |
| Pea | 70 | 80 | 100 |
| Cucumber | 55 | 65 | 80 |
| Cotton | 0 | 15 | 30 |
| Tomato | 25 | 45 | 70 |
| Stone-leek | 40 | 70 | 100 |
| Carrot | 70 | 100 | 100 |

It will seem from the above results that barnyard grass, corn, pea, carrot and stone-leek are susceptible to 3-phenoxypyridazine, while, for example, cotton is resistant thereto and therefore this compound is utilizable as a selective herbicide.

EXPERIMENT 3.—HERBICIDAL TEST IN A WHEAT FIELD

Pre-emergence treatment

Appropriate amounts of the seeds of wheat and oat were sowed and covered with soil at a depth of about 2 cm. After 2 days, the wettable powder containing the test compound, 3-phenoxypyridazine, was diluted with water and sprayed upon the covering soil at a given rate. After 68 days of the treatment, the number of growing weeds and the degree of damage of the crops were investigated and evaluated upon the following grades:

Herbicidal rating

| | Percent |
|---|---|
| 5 | 0–10 |
| 4 | 11–20 |
| 3 | 21–40 |
| 2 | 41–60 |
| 1 | 61–80 |
| 0 | 81–100 |

The number of growing weeds in the test plots expressed in terms of percentage, when that of growing weeds in a non-treated plot is defined as 100.

Degree of damage of the crops

| | |
|---|---|
| 5 | Dead. |
| 4 | Severely damaged. |
| 3 | Considerably damaged. |
| 2 | Moderately damaged. |
| 1 | Slightly damaged. |
| 0 | Not damaged. |

Post-emergence treatment

Wheat and oat, both of which were at a height of about 5–6 cm. at the one or two leaf stage, as well as weeds of about 1.5–2 cm. in height and at the one leaf stage, were treated in the same manner as mentioned above. After 54 days of the treatment, herbicidal effects and the degree of damage of the crops were investigated, based upon the same grades as defined above. These results are given in the following Table III.

TABLE III

| | Concentration of test compound (g./a.) | | | |
|---|---|---|---|---|
| | 10 | 25 | 50 | 75 |
| | Herbicidal Effect | | | |
| | 4 | 5 | 5 | 5 |
| | Degree of damage of crops | | | |
| Pre-emergence treatment: | | | | |
| Wheat | 0 | 0 | 4 | 5 |
| Oat | 0 | 0 | 4 | 5 |
| | Herbicidal Effect | | | |
| | 3 | 4 | 5 | 5 |
| | Degree of damage of crops | | | |
| Post-emergence treatment: | | | | |
| Wheat | 0 | 0 | 0 | 4 |
| Oat | 0 | 0 | 0 | 4 |

It will be seen from the above results that 3-phenoxypyridazine shows a high herbicidal effect at a rate of 10–25 g./a. by preemergence treatment, and at a rate of 25–50 g./a. by post-emergence treatment, while no phytotoxicity to wheat and oat is being observed in the cited amounts.

EXPERIMENT 4.—HERBICIDAL TEST IN PADDY FIELD

The soils for a paddy field were charged into a pot of an area of 150 square centimeters, rice plants (at the four or five leaf stage) and slender spike rush were transplanted, seeds of barnyard grass were sowed and then water was filled at a depth of about 3 cm. on the said soil. On the next day, the wettable powders containing the test compounds given below were diluted with water and applied to the soil at a rate of 30 g. of the specific comopnud per area. After 30 days of the treatment, the growth of slender spike rush, barnyard grass and spontaneously growing broad-leafed weed as well as rice plants were observed. The results are given in the following Table IV. In this table, herbicidal effects were shown, based upon the same grades as in Experiment 3; provided that herbicidal effects on slender spike rush were evaluated on the same grades as described in the degree of damage of the crops in Experiment 3.

TABLE IV

| Test compound [1], Xn | Barnyard grass | Broadleafed weed | Slender spikerush | Phytotoxicity |
|---|---|---|---|---|
| H | 5 | 5 | 3 | |
| 2-CH$_3$ | 5 | 4 | 4 | |
| 2-Cl | 5 | 5 | 4 | |
| 3-Cl | 5 | 5 | 4 | |
| 2,6-di-Cl | 5 | 4 | 4 | |
| 2,4,6-tri-Cl | 4 | 3 | 4 | |
| 3-CH$_3$-4-Cl | 4 | 5 | 4 | |
| 2,4-di-Cl-6-CH$_3$ | 3 | 4 | 4 | |
| H (hydrochloride) | 5 | 5 | 4 | |
| 2-CH$_3$ (sulfate) | 5 | 5 | 4 | |
| H (trichloroacetate) | 5 | 5 | 4 | |
| Control (3-phenoxy-6-chloropyridazine) | 3 | 1 | 1 | |

[1] As to test compounds, only "Xn" substituents in the above formula (I) will be shown in this table for convenience's sake.

It will be noted from the above results that the active compounds in this invention have excellent herbicidal effects for the treatment of the paddy field without phytotoxicity to rice plants.

The present method of utilizing the above-specified compounds for plant growth retarding purposes is based upon the fact that such compounds may exert a plant growth retarding activity to the growing plants without killing those plants. Thus, when applied, for example, by spraying or brushing on any growing point or any part of leaves at a concentration not so high as to kill the plants, the active compounds of this invention will be absorbed into the plants, carried to various parts of the plants and then accumulated mainly in those growing parts of buds and roots to inhibit cell-cleavage or the growth of cell, so that the growth of lateral buds, the growing points or the underground parts of roots being retarded.

When such compounds are likewise applied to the plants above the ground, the formation of abscission layers is promoted, thereby causing defoliation but no harmful affection on the stems.

The plant growth retarding effects of the active compounds of this invention are more fully illustrated by the following experiments and results.

EXPERIMENT 5.—GROWTH RETARDING TEST

The test compounds, which were diluted to a given concentration with isophorone, where applied to sweet potato seedlings with six leaves by coating on both sides of one of the middle leaves. After air-drying, the host plants were water cultured in Knop's solution. After 30 days, the growth of buds and the elongation of newly growing roots were investigated and expressed in terms of percent, as compared with those of the control. The results are given in the following Table V.

TABLE V

| | Concentration (p.p.m.) | | | | | |
|---|---|---|---|---|---|---|
| | 50 | | 250 | | 750 | |
| Test compound | Bud, percent | Root, percent | Bud, percent | Root, percent | Bud, percent | Root, percent |
| 3-phenoxypyridazine | 7 | 41 | 5 | 17 | 0 | 15 |
| 3-(4-chlorophenoxy)-pyridazine | 35 | 73 | 21 | 30 | 0 | 18 |
| 3-(2,4-dichlorophenoxy) pyridazine | 40 | 70 | 25 | 34 | 5 | 17 |

It will be appreciated from the above results that the active compounds of this invention show good growth retarding effects at a suitably controlled concentration.

EXPERIMENT 6.—TEST FOR THE PREVENTION OF THE GROWTH OF LATERAL BUDS

Sweet potato seedlings with 5 newly growing leaves were harvested and the growing points were removed therefrom. The test compounds diluted to a given concentration with lanolin were coated on the second lateral bud from the head. The treated seedlings were water cultured in Knop's solution. After 25 days, the growth rates of the lateral bud were investigated and expressed in terms of percent, as compared with that of the control. The results are given in the following Table VI.

TABLE VI

| | Concentration (p.p.m.) | | |
|---|---|---|---|
| Test compound | 100, percent | 250, percent | 500, percent |
| 3-phenoxypyridazine | 21 | 17 | 0 |
| 3-(2-methylphenoxy)-pyridazine | 20 | 10 | 0 |
| 3-(2,4,6-trichlorophenoxy)-pyridazine | 25 | 20 | 0 |
| 3-phenoxypyridazine hydrochloride | 15 | 0 | 0 |

It will be apparent from the above results that the active compounds of this invention show remarkable growth retarding effects on lateral buds only and therefore may be conveniently employed as an agent for retarding the growth of lateral buds.

Experiment 7.—Test for defoliation

Sweet potato seedlings with 5 newly growing leaves were immersed upside down for 5 minutes in a solution containing test compound given below at a given concentration to assure the sufficient deposition of the said solution thereon, and then air-dried. Thereafter, the treated seedlings were water cultured in Knop's solution for 20 days, during which time defoliation rates were investigated. The results are given in the following Table VII.

TABLE VII

| Test compound | Concentration (p.p.m.) | | |
|---|---|---|---|
| | 250, percent | 500, percent | 750, percent |
| 3-phenoxypryidazine | 80 | 100 | 100 |
| 3-(3-methyl-4-chloro-phenoxy) pyridazine. | 40 | 60 | 80 |

It will be seen from the above results that the active compounds of this invention show good defoliation effects. Further, in this experiment, it was observed that the stems of the seedlings were not injured and fresh leaves were regenerated.

What is claimed is:

1. A method for the control of undesired plants which comprises applying to the locus to be protected a herbicidally effective amount of a composition containing 0.5 to 95% by weight of a compound selected from the group consisting of compounds having the formula

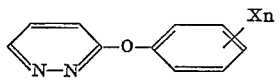

wherein X represents hydrogen, methyl or chlorine and $n$ is an integer of 1 to 5 inclusive; provided that, when $n$ is an integer of 1 to 3 inclusive, X may be the same or different and, when $n$ is an integer of 4 or 5, each X represents chlorine, and the herbicidally active inorganic and trichloroacetic acid addition salts of the said compound having the above formula, wherein $n$ is an integer of 1 to 3 inclusive and X is hydrogen or methyl.

2. The method according to claim 1 wherein said compound is 3-phenoxypyridazine.

3. The method according to claim 1 wherein said compound is 3-(2-methylphenoxy)pyridazine.

4. The method according to claim 1 wherein said compound is 3-(2-chlorophenoxy)pyridazine.

5. The method according to claim 1 wherein said compound is 3-(2,4,6-trichlorophenoxy)pyridazine.

6. The method according to claim 1 wherein said compound is 3-(3-methyl-4-chlorophenoxy)pyridazine.

7. The method according to claim 1 wherein said compound is 3-phenoxypyridazine hydrochloride.

8. A method for retarding plant growth which comprises applying to plants a plant growth retarding amount of a composition containing 0.5 to 95% by weight of a compound selected from the group consisting of compounds having the formula

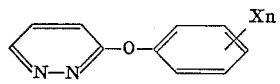

wherein X represents hydrogen, methyl or chlorine, and $n$ is an integer of 1 to 5 inclusive; provided that, when $n$ is an integer of 1 to 3 inclusive, X may be the same or different and, when $n$ is an integer of 4 to 5, each X represents chlorine, and the herbicidally active inorganic and trichloroacetic acid addition salts of said compound having the above formula wherein $n$ is an integer of 1 to 3 inclusive and X is hydrogen or methyl.

9. The method according to claim 8 wherein said compound is 3-phenoxypyridazine.

10. The method according to claim 8 wherein said compound is 3-(2-methylphenoxy)pyridazine.

11. The method according to claim 8 wherein said compound is 3-(2-chlorophenoxy)pyridazine.

12. The method according to claim 8 wherein said compound is 3-(2,4,6,-trichlorophenoxy)pyridazine.

13. The method according to claim 8 wherein said compound is 3-(3-methyl-4-chlorophenoxy)pyridazine.

14. The method according to claim 8 wherein said compound is 3-phenoxypyridazine hydrochloride.

References Cited

Itai et al.: "Syntheses of Pyridazine Ders." (1954) CA49, p. 14768 (1955).

Tamura I et al.: "Synthesis of Pyridazine Ders. etc.," (1963) CA60, p. 2928 (1964).

Tamura II et al.: "Herbicidal Activity of Some Pyridazine Ders." (1963) CA60, p. 7379 (1964).

Kealy: "3(2H) Disubstituted Pyridazines" (1961) CA 61 p. 3125 (1964) U.S. Patent 3,133,064.

Holzer: "Herbicidal Pyridazine Ders." (1961) CA56, p. 8728 (1962) Ger. 1,098,000.

Jojima et al.: "Synthesis of Pyridazine Ders. as Herbicides." June (1965) CA63, p. 601 (1965).

Greulach: "Screening Tests of Hydrazides, Pyridazine Ders. etc." (1961) CA55, p. 22692 (1961).

LEWIS GOTTS, *Primary Examiner.*

G. HOLLRAH, *Assistant Examiner.*

U.S. Cl. X.R.

71—78, 92; 260—250